Dec. 6, 1960 — J. E. SAYERS — 2,963,110
DUST COLLECTOR
Filed June 19, 1957

JAMES EDMUND SAYERS
INVENTOR

ATTORNEY

United States Patent Office 2,963,110
Patented Dec. 6, 1960

2,963,110

DUST COLLECTOR

James E. Sayers, Bearsden, Glasgow, Scotland, assignor to Apra Precipitator Corporation, New York, N.Y., a corporation of Delaware Filed June 19, 1957, Ser. No. 666,661

2 Claims. (Cl. 183—7)

This invention relates to dust separating and collecting systems of the kind which includes a mechanical separator separating the coarser dust particles and an electrostatic precipitator receiving the gas flow from the mechanical separator and separating out the fine dust particles.

In dust separating systems of this kind, the precipitator must be cleaned at relatively frequent intervals and it has been proposed to isolate banks of electrodes of the precipitator in turn and to subject the isolated electrode banks to a high velocity gas flow which scavenges said bank and removes the fine dust deposited therein. The scavenging gas stream may for example then be passed through a secondary mechanical separator to remove the fine dust from the gas stream which is then returned to the main gas flow usually upstream of the primary mechanical separator.

In such systems the removal of the fine dust particles has hitherto not been wholly satisfactory, and the primary object of this invention is to provide a method of and system for extracting the dust, and more particularly the fine dust particles, in a more efficient manner.

According to the present invention, a method of separating dust from a dust laden gas stream utilizing a primary dust separator wherein coarse dust particles are separated out and an electrostatic precipitator receiving the main gas flow from the primary separator, wherein fine dust particles are separated and are periodically removed by a scavenging gas stream, includes the step of leading the scavenging gas stream and the fine particles carried thereby and the coarse dust particles from the primary separator into a common secondary separator.

The invention also includes a method of separating dust from a dust laden gas stream which consists in dividing said dust laden gas stream in a primary separator into a first gas flow bearing finest dust particles, a second gas flow bearing coarse dust particles and a third gas flow bearing intermediate sized dust particles, electrostatically precipitating the finest dust particles from said first gas flow and the intermediate sized particles from said third gas flow, conveying said finest and said intermediate sized particles by means of scavenging gas streams to a secondary separator, and also conveying said second gas flow bearing coarse particles to said secondary separator.

According to a further feature of the present invention, a dust separating system comprises a primary separator separating out coarse particles, an electrostatic precipitator separating fine dust particles contained in the gas discharge from the primary separator, means to provide a scavenging gas stream through the precipitator to remove said fine particles, and a secondary separator adapted to receive the coarse particles from the primary separator and the fine particles carried by said scavenging gas stream. The principal effect of the mixing chamber and secondary collector is to insure that fines from the precipitators are mixed with coarse particles from the classifier so that the fines will agglomerate on the larger particles and become separated from the gas stream in the separator.

Figure 1:
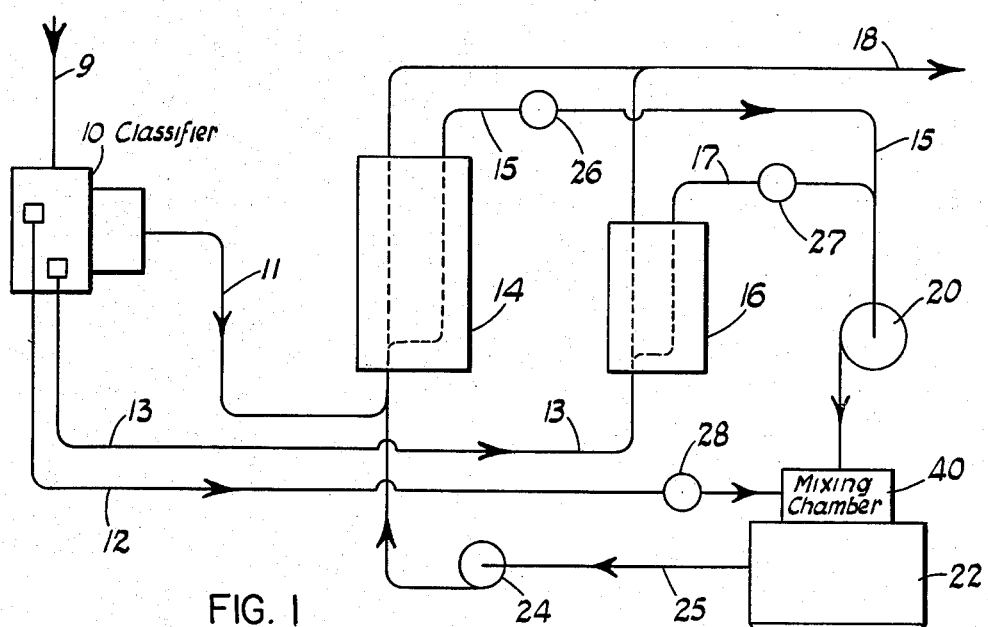
Figure 1 is a schematic view of a dust separating system embodying the invention.

In one embodiment of dust separating plant arranged according to this invention, which will now be described by way of example, a dust-laden gas stream 9 is fed into a primary separator 10 which is preferably of the cyclone type, having the highest extraction efficiency on large or coarse dust particles substantially all the coarse particles are extracted from the gas stream and these particles are carried away from the separator by a minor portion (referred to hereinafter as the second gas flow) of the gas steam.

The small or fine particles of dust are substantially not removed in this primary separator 10 and the major portion of the gas, still carrying these fine particles, is fed through a conduit 11, into a main electrostatic precipitator 14, in which the fine dust particles are precipitated. The precipitator 14 is preferably divided into separate banks of electrodes, and each bank is isolated in turn from the main gas flow and is then subjected to a high velocity scavenging gas stream whereby the dust precipitated in that bank, during the preceding operative period, is dislodged and carried away through a duct 15. This scavenging gas stream is preferably obtained by drawing a portion of the gas constituting the main gas flow through the isolated bank of electrodes. A precipitator of this type is illustrated in Klemperer Patent 2,887,175.

The cyclone or primary separator 10 is provided with a further discharge in a zone of separation of intermediate sized particles from the dust laden gas stream, which particles are carried through a conduit 13 by a minor portion (hereinafter referred to as the third gas flow) of the gas stream to a supplementary electrostatic precipitator 16 wherein these particles are precipitated.

The supplementary precipitator 16 is of similar construction to the main precipitator 14, but by reason of the smaller volume of gas passing through the supplementary precipitator 16, it may be of smaller size, and the precipitated dust is removed as hereinbefore described by a scavenging gas stream through a duct 17. The cleaned gas from each of the precipitators is combined and is led away through a main gas outlet 18.

It will be understood from the foregoing that the primary separator 10 has three separate outlets 11, 12, 13. From one outlet 11 the main gas flow carrying fine dust particles flows to the main precipitator 14, from another outlet 13 the third gas flow carrying intermediate sized particles flows to the supplementary precipitator, and the second gas flow carrying coarse dust particles issues from a further outlet 12.

A scavenging fan 20 draws the scavenging gas streams through ducts 15, 17 from each precipitator and feeds these two scavenging gas streams to a mixing chamber 40 and then to a secondary collector 22 of the cyclone type. The second gas flow 12 carrying the coarsest particles is also fed to this mixing chamber 40 and secondary collector 22 in which substantially all the dust is separated from the gas and is then collected in a hopper 23 situated below the secondary separator. The secondary separator 22 is preferably of the multi-cell reverse flow type comprising a plurality of small cyclones arranged in parallel in the gas stream.

The gas, cleaned in the secondary separator 22, is then returned by means of a further fan 24 through duct 25 to the main gas stream, either upstream or downstream of the primary separator 10. In most cases it is preferred to return this gas to the main gas flow intermediate the primary separator 10 and the main precipitator 14, i.e. into duct 11 downstream of the primary separator 10. This is because the large particles have been removed in separator 22 and therefore the recycle stream does not need to pass again through classifier 10.

Dampers or control valves 26, 27, 28 are preferably included in each of the conduits conveying the scavenging gas streams and the second gas flow to the secondary separator.

The dust extraction system hereinbefore described has the advantage that by separating the majority of the dust particles from the main gas flow before it enters the main precipitator 14, only a small amount of dust is precipitated in this precipitator and therefore the power consumed in scavenging this dust is less than with conventional systems. Also the power required to scavenge the supplementary precipitator 16 is small since this precipitator is of small size.

Figure 2:
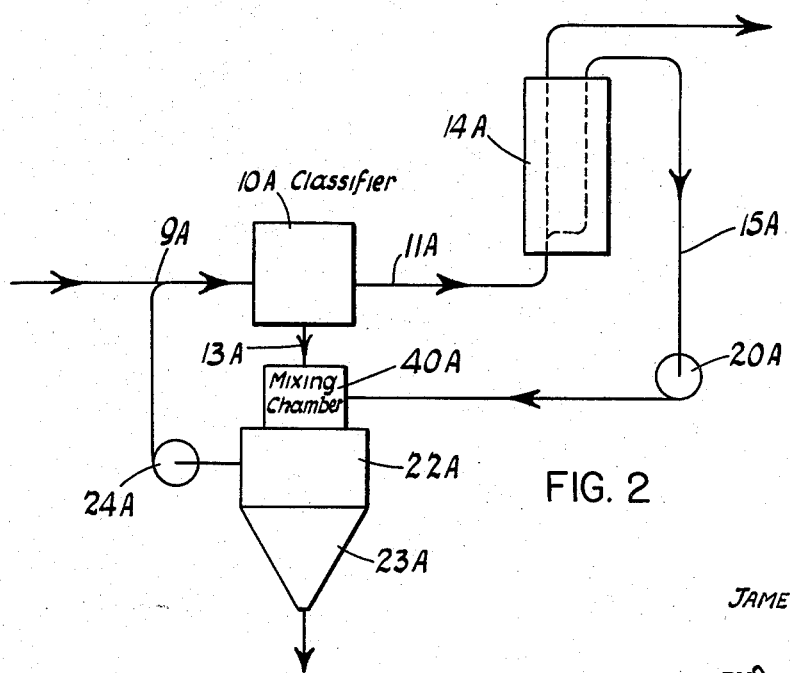
Figure 2 is a schematic view of a modified system.

A further form of a dust separating system according to this invention is illustrated in Figure 2. The primary separator 10A consists of a multi-vortex type of separator, in which the dust laden gas is fed through a large number of cells and the coarse dust is separated out by a vortex action in each cell. A main gas flow 11A still bearing fine dust particles is fed to an electrostatic precipitator 14A in which the fine dust is separated out. A small portion of the gas bearing the coarse dust particles is fed through duct 13A to a mixing chamber 40A located intermediate said primary separator 10A and a secondary separator 22A, preferably of the reverse flow multi-cell type. A scavenging gas stream drawn through duct 15A is utilized to remove the dust from the precipitator 14A and to carry it to the said mixing chamber 40A.

The gas and dust received in the mixing chamber 40A is then fed into the said secondary separator 22A, and the dust is separated out from the gas and is collected in a hopper 23A. The cleaned gas is returned to the main gas stream 9A by a fan 24A upstream of the primary separator 10A, or alternatively it may be returned to the precipitator 14A.

What is claimed is:

1. In a system for separating particulate material from a laden gas stream having an electrostatic precipitator with collecting elements between main inlet and outlet ducts, an outlet duct connected to said precipitator to discharge a stream of purging gas flowing over the collecting elements thereof, the improvement comprising: classifier means located in the gas stream in advance of the precipitator for classifying and separating the particulate material into particles of relatively fine and relatively large grade sizes; a gas duct connected to said classifier means for carrying the particles of fine grade to the main inlet of said precipitator; a mixing chamber connected and arranged to receive coarse particles from said classifier means and also the dust laden purging gas from the outlet therefor of said precipitator; and a gas cleaning device arranged to receive the mixed particles and carrier gas from said mixing chamber.

2. A gas cleaning system as recited in claim 1 wherein said classifier means separates the particulate material into relatively fine, relatively coarse and intermediate grades; characterized in that the intermediate grade of particulate material is discharged into a supplementary electrostatic precipitator from which a related stream of purging gas is discharged into said mixing chamber along with coarse particles from said classifier means and the stream of purging gas from the main precipitator.

References Cited in the file of this patent

UNITED STATES PATENTS

| | | |
|---|---|---|
| 2,382,253 | Penney et al. | Aug. 14, 1945 |
| 2,548,332 | Alexander et al. | Apr. 10, 1951 |